(12) United States Patent
Glaab

(10) Patent No.: US 6,188,870 B1
(45) Date of Patent: Feb. 13, 2001

(54) PASSIVE INTERDICTION SYSTEM FOR SCRAMBLING

(75) Inventor: Joseph Glaab, New Hope, PA (US)

(73) Assignee: General Instrument Corporation, Horsham, PA (US)

( * ) Notice: Under 35 U.S.C. 154(b), the term of this patent shall be extended for 0 days.

(21) Appl. No.: 08/726,748

(22) Filed: Oct. 7, 1996

(51) Int. Cl.$^7$ .................................................. H04N 7/16
(52) U.S. Cl. ................................ 455/6.1; 348/6; 380/209
(58) Field of Search ............................ 348/1, 4, 5.5, 10, 348/11; 455/3.1, 6.1, 6.2, 6.3; 380/10, 15, 20, 209; H04N 7/167, 7/16

(56) References Cited

U.S. PATENT DOCUMENTS

| 3,859,457 | * | 1/1975 | Kirk, Jr. ............................... 380/20 |
| 4,586,077 | * | 4/1986 | Wonn et al. ......................... 348/5.5 |
| 5,014,309 |   | 5/1991 | West, Jr. ............................. 380/7 |
| 5,027,399 |   | 6/1991 | Cordle et al. ....................... 380/7 |
| 5,140,633 | * | 8/1992 | Gurusami et al. ................... 380/7 |
| 5,142,574 |   | 8/1992 | West, Jr. et al. ................... 380/7 |
| 5,208,854 |   | 5/1993 | West, Jr. ............................. 380/7 |
| 5,245,420 |   | 9/1993 | Harney et al. ..................... 358/86 |
| 5,287,539 |   | 2/1994 | West, Jr. ............................. 455/1 |
| 5,303,295 |   | 4/1994 | West et al. ......................... 380/10 |
| 5,311,325 |   | 5/1994 | Edwards et al. ................... 348/5.5 |
| 5,323,462 |   | 6/1994 | Farmer ............................... 380/7 |

\* cited by examiner

Primary Examiner—Chris Grant
(74) Attorney, Agent, or Firm—Volpe and Koenig, P.C.

(57) ABSTRACT

The passive interdiction system for CATV scrambling provides a plurality of passive, preselected negative signal traps for securing specific CATV channels. Each trap cyclically attenuates the desired CATV channel thereby confusing the AGC (automatic gain control) circuit of the television monitor-receiver or video cassette recorder (VCR) by rapid cancellation and restoration of the picture carrier and main signal components. The passive interdiction system is comprised of a plurality of SAW (surface acoustic wave) resonators tuned to specific frequencies corresponding to the carrier frequencies of the channels to be secured and are alternately keyed on and off by a 10 to 20 Hz square wave. Authorization and control of the secured channels originates at the cable provider's headend and is transmitted contemporaneously with the CATV programming. The authorization data is specifically addressed and decoded at unique interdiction units disposed within the CATV system. The SAW resonators exhibit a low value temperature coefficient yielding stable trap frequency responses.

6 Claims, 3 Drawing Sheets

PASSIVE INTERDICTION SYSTEM FOR SCRAMBLING

BACKGROUND OF THE INVENTION

1. Field of the Invention

This invention relates generally to cable television communication systems. More particularly, the invention relates to a method and apparatus for selectively permitting access to cable television communication system services.

2. Description of the Related Art

A number of different types of cable television (CATV) security systems exist to block premium or pay channel signals to those subscribers unwilling to pay for the various services. One of the more popular methods of signal scrambling is based on sync suppression. Located at the headend of a CATV system, video processing circuits suppress the horizontal synchronizing pulse from the video signal. The sync information is obscured from the sync separator of a television receiver by relocating it within the transmitted picture information. Since television receivers are unable to process a synchronization suppressed signal with the horizontal pulse relocated, the signal is scrambled. Subscribers desiring to view the scrambled channels must have a CATV settop terminal which is programmed to activate circuits to restore the suppressed horizontal synchronizing signal.

A simpler alternative to provide premium channel security is through the use of negative and positive trapping filters. The negative signal trap includes a network of passive electronic components, such as capacitors and inductors, in the form of a notch filter which is connected in series with a subscriber's CATV drop line. The filter removes a selected channel supplied to a subscriber's home. Negative signal traps are usually mounted outside of a subscribers' home on a utility pole nearby the cable tap. This method of channel security is the most secure since to defeat the trap requires access to the CATV plant located outside of a subscriber's home and would require climbing a utility pole.

However, this method of policing CATV has become unmanageable with the growing number of available channels in CATV communication systems. A negative type signal trap is required for each channel to be secured. The cost of using negative trapping filters is prohibitive when only a small number of subscribers desire the secure channels since a separate trap must be installed on the drop line of every subscriber not authorized to receive that channel.

Positive signal trapping injects an interfering signal in the secured channel carrier at the headend of a CATV system to render the programming on that channel unviewable. Authorized subscribers are given narrow band rejection filters which attenuate the interfering signal to restore the secured channel. Although the positive traps are inexpensive, the method is easy to defeat since all that is required to receive a clear picture is a notch filter of the correct frequency which are easy to obtain.

In an effort to eliminate the local filtering pitfalls, interdiction systems which introduce an interfering signal local to the subscriber are sometimes used. Typically, the system includes a plurality of a pole-mounted devices, each of which serves a minimum of four subscribers. The interdiction devices contain an authorization module incorporating address-recognition circuitry which monitors the downstream broadband signal to decode signals representing a unique subscriber's address and channel authorization information to selectively switch on or move jamming oscillators from channel to channel. The interfering or jamming signal is injected into a particular subscriber's unauthorized channels to confuse the television receiver's detector circuitry. Although a settop terminal or a cable-ready television receiver which can tune mid and superband CATV channels is required, no descrambler is needed.

Interdiction systems usually employ a frequency agile jamming oscillator which is used for a plurality of different carrier frequencies on a time division basis. The jamming signal must have high accuracy and temperature tolerances so as not to deviate from the desired carrier frequencies of the unauthorized channels. In real practice, unwanted artifacts are manifested in other regions of the transmission, thereby degrading overall reception quality to a given subscriber. Additionally, oscillator leakage may degrade the quality of signals to neighboring subscribers.

The most recent development in channel security is the use of a microprocessor within a settop terminal coupled with a receiver and address recognition circuitry. The settop terminal is addressable such that the CATV headend directly communicates with an individual subscriber. In this manner, the subscriber's CATV settop terminal observes a dedicated carrier carrying addressing data where it accesses encoded instructions specific to a secured channel and updates the settop terminal to permit viewing.

Unfortunately, all prior art methods for signal security present significant drawbacks of expense and technical problems for the cable provider. There is a need for an improved and inexpensive program deprivation unit regardless of the type of settop terminal or the sophistication of the television receiver used.

SUMMARY OF THE INVENTION

The present invention provides a plurality of passive, preselected negative signal traps for the carrier frequencies to be deprived. Each trap cyclically attenuates the desired CATV channel thereby confusing the AGC (automatic gain control) circuit of the television receiver or video cassette recorder (VCR) by rapid cancellation and restoration of the picture carrier and main signal components. The passive interdiction system uses a series of negative traps rather than a jamming oscillator obviating oscillator feedthrough along with the concomitant input level control requirements.

The passive interdiction system is comprised of a plurality of SAW (surface acoustic wave) resonators tuned to specific frequencies corresponding to the carrier frequencies of the channels to be secured and are alternately keyed on and off by a 10 to 20 Hz square wave. Authorization and control of the secured channels originates at the cable provider's headend and is transmitted contemporaneously with the CATV programming. The authorization data is specifically addressed and decoded at unique interdiction units disposed within the CATV system. The SAW resonators exhibit a low value temperature coefficient yielding stable trap frequency responses. This method is sufficient to create confusion or bounce in the AGC of a television receiver.

Accordingly, it is an object of the present invention to provide a passive interdiction system for CATV channel security.

Other objects and advantages of the system and method will become apparent to those skilled in the art after reading the detailed description of the preferred embodiment.

DETAILED DESCRIPTION OF THE PREFERRED EMBODIMENT

Figure 1:
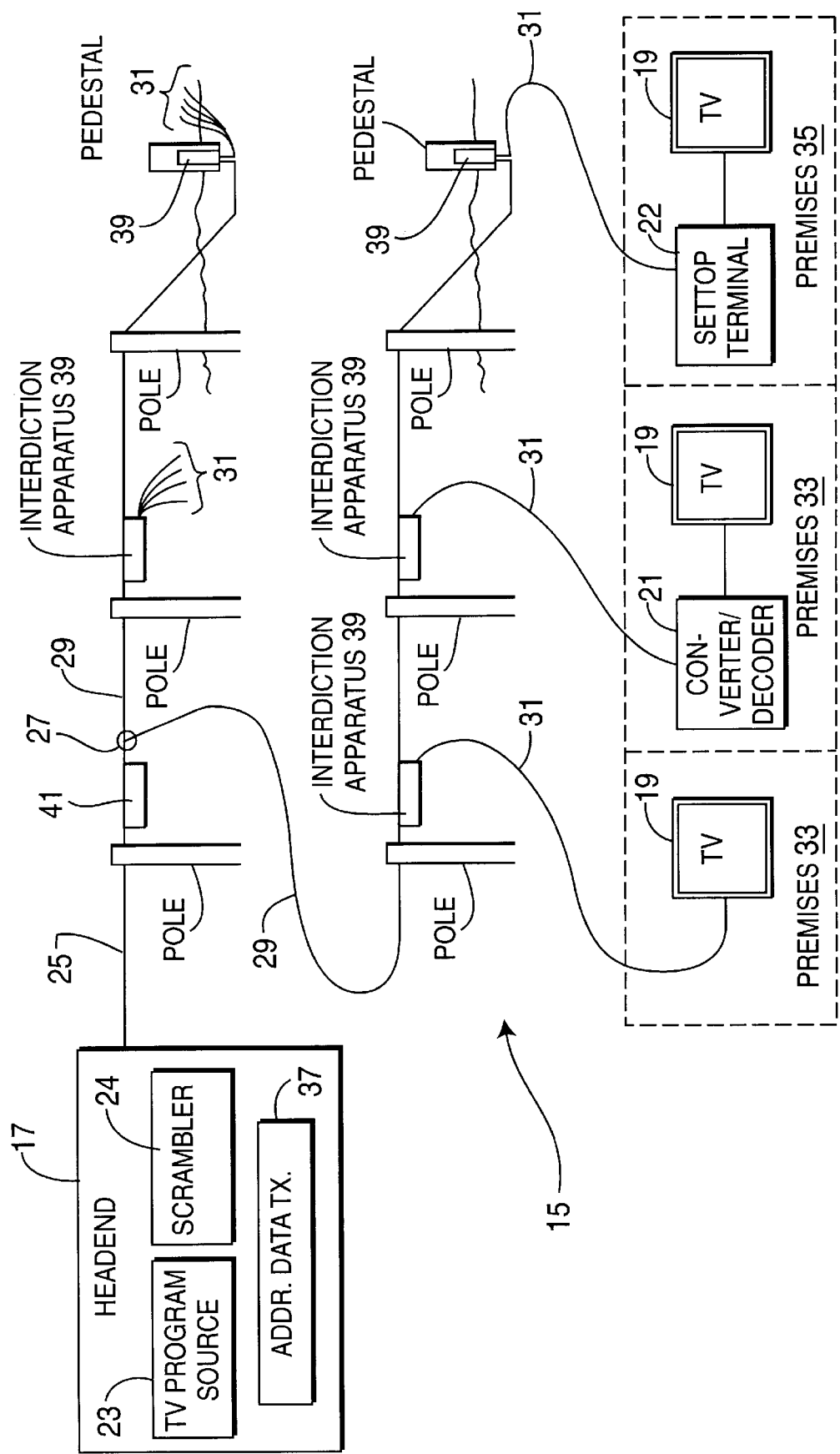
FIG. 1 is a block diagram illustrating a typical CATV distribution plant employing the service denial system.

The preferred embodiment will be described with reference to the drawing figures where like numerals represent like elements throughout.

With reference to FIG. 1, the topology of a typical CATV distribution plant 15 for distributing CATV signals downstream to a subscriber and for receiving return path messages from a subscriber settop terminal is shown. The CATV distribution plant 15 connects a headend 17 to a plurality of subscriber's television receivers 19. The distribution plant 15 may include satellite uplinks, a network broadcast system, or private cable broadcast systems as a signal source 23. The signals may comprise analog or digital video, audio, video and audio, or data. The distribution plant 15 begins with a coaxial or fiber optical trunk line 25 coupled to the headend 17. Some portions of the CATV plant 15 may comprise optical fiber cables or even microwave links instead of coaxial transmission cables depending upon cable operator cost constraints and desired electrical and reliability performance.

At points where the transmission cable divides, bidirectional signal splitters/combiners 27 are installed. Trunk lines 25, branch lines 29 and drop lines 31 provide the bidirectional transport medium between the headend 17 and subscriber television receivers 19 within the CATV system 15. All CATV subscribers typically receive the same broadband CATV signals sent from the headend 17.

The broadband CATV signals sent from the headend 17 may include channels that must be secure from unauthorized reception at various subscriber locations 33, 34 and 35. In accordance with the present invention, the secured programming may be transmitted with or without signal scrambling 24. The present invention applies passive interdiction outside of the subscriber locations 33, 34, 35 rendering unauthorized channels unviewable. Since channel security is performed outside of the various subscriber locations 33, 34, 35, a subscription to basic cable may be secured in their premises 33. Subscriptions to premium CATV programming may likewise be secured whether the television receiver 19 is cable ready or not and requires the use of a CATV convertor/decoder 21 or more sophisticated CATV services are provided using bidirectional CATV communications requiring the use of a settop terminal 22.

An addressable data transmitter 37 is located at the headend 17 for generating command signals. The addressable commands may be transmitted over an "out-of-band" control data channel (CDC), which is a separate and distinct transmission channel from the broadcast transmission channels. Alternatively, the addressable commands may be contained "in-band" within a subband portion or vertical blanking interval (VBI) of each broadband transmission channel. In this embodiment, the commands are contained in an out-of-band modulated digital data channel. The use of in-band and out-of-band signal transmission is well understood by those skilled in the art.

Commands to deny service to a particular subscriber 33, 34 and 35 are transmitted from the headend 17. Each command comprises a continuous command string which includes a subscriber's unique address and a command authorization signal. The command authorization signal represents the channel or channels to be secured.

Channel authorization data is transmitted via the addressable data transmitter 37 over the trunk 25 and branch 29 lines. The passive interdiction system 39 is mounted on a cable support strand, or within a land pedestal outside of a subscriber's premises 35. Four or more subscriber feedlines may be sourced by the passive interdiction system 39. Power for the passive interdiction system is provided over the cable distribution system 15 from power inserters 41 intermittently placed along the trunk 25 and branch 29 lines.

Figure 2:
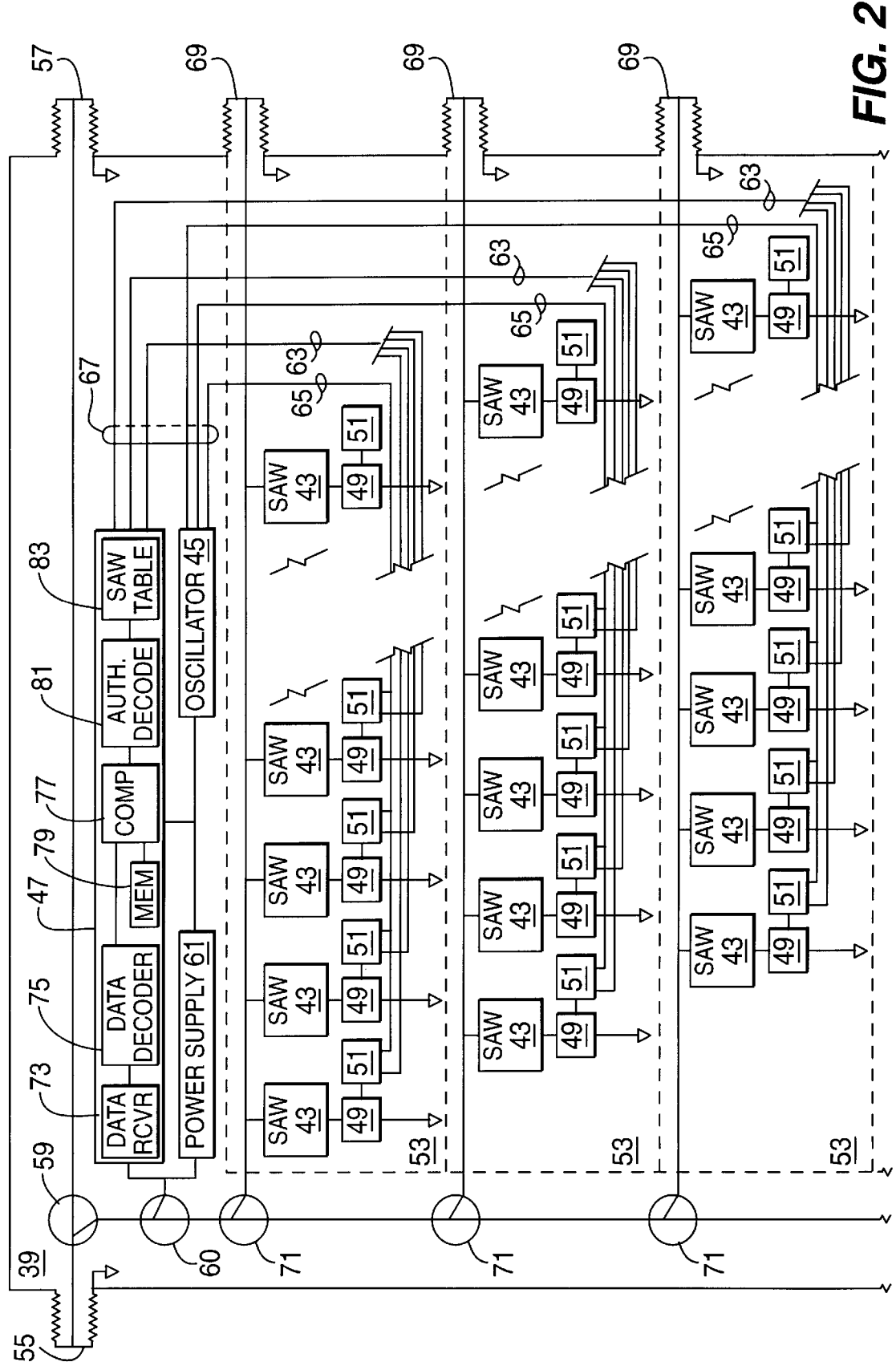
FIG. 2 is a block schematic diagram of an addressable, passive service denial system for selectively allowing secured cable channel viewing.

As shown in FIG. 2, the passive interdiction system comprises a plurality of SAW resonators 43 tuned to preselected cable channel frequencies, a low frequency oscillator 45 producing a 10 to 20 Hz squarewave, an authorization module 47 containing address recognition circuitry, a plurality of solid state switches 49 and a plurality of AND gates 51. Each SAW resonator 43 is tuned to a specific CATV channel frequency and blocks a very narrow band of frequencies. Each SAW resonator 43 exhibits a minimum 20 dB deep notch at the resonant frequency. The SAW resonators 43 are keyed on and off in dependence upon an output from the subscriber authorization module 47.

The addressable data transmitter 37, (shown in FIG. 1), transmits address and authorization data over the CATV distribution system 15 which is received and decoded by the interdiction system 39. The subscriber's unique address is compared to the transmitted data. If an address match is positive, the following command string relays the secured channel information.

The authorization data is a multibit binary word conveying information representing the respective secured channels. The authorization data word maps bit one to SAW resonator 1, bit two to SAW resonator 2, and so on for a given subscriber module 53. If a bit in a given position in the authorization data word is a binary zero, the SAW resonator corresponding to that position is not activated and the channel corresponding to that resonator is not impaired. If the authorization data bit is a binary one, the corresponding SAW resonator will be activated and the corresponding channel will be secured.

The passive interdiction system 39 typically houses four (4) or more subscriber modules 53 and common addressing circuitry. Each subscriber module is comprised of a plurality of SAW resonators 43 and associated solid state switches 49 and AND gates 51. The number of SAW resonators 43 varies with the number of channels that can be secured. A particular subscriber module secures unauthorized channels via the drop line 31 to a unique subscriber 33, 34, 35.

Referring again to FIG. 2, the broadband CATV transmission enters the interdiction system via a branch line 29 at an input connector 55 and passes undisturbed through an output connector 57. A bidirectional coupler 59 taps the. broadband CATV signal transmission to provide a broadband CATV transmission to each of the subscriber modules 53. Connected to another downstream directional coupler 60 is a power supply 61 where the impressed ac voltage is separated from the broadband RF signal. The power supply 61 rectifies the ac voltage and outputs a regulated dc output voltage to the interdiction circuitry. The authorization module 47 monitors all broadband transmissions from the headend 17 and is provided with a nonvolatile memory which contains the unique addresses of the subscribers serviced by the interdiction system 39.

Coupled to the power supply 61 is a variable oscillator 45 which produces a square wave output 65 for distribution to each subscriber module 53. Preferably, the output is between 10 and 20 Hz. Also distributed to each subscriber module 53 is an address link 63 from the authorization module 47. The authorization module 47 controls the SAW resonators 43 within each subscriber module 53. Each subscriber module 53 is connected to the common circuitry by a multiconductor bus 67 and has a dedicated output connector 69 coupling the passive interdiction system 39 to a unique subscriber drop line 31.

Figure 3:
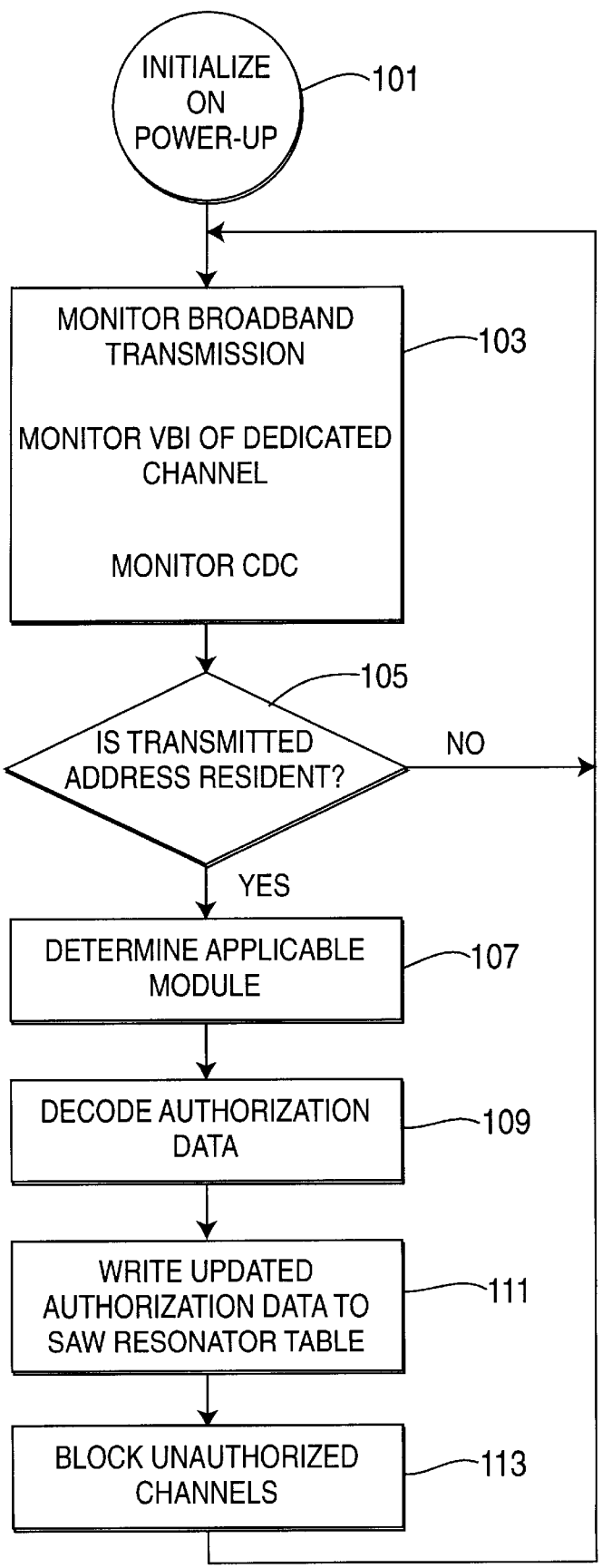
FIG. 3 is a flow chart depicting the operation of the passive service denial system.

The authorization module 47 contains a data receiver 73 which receives the command string from the addressable data transmitter 37 located at the headend 17. As shown in FIG. 3, after the interdiction unit is powered and initialized (step 101) the data receiver 73 demodulates the in-band or out-of-band carrier (step 103) and passes the data stream to a data decoder 75 which, in accordance with a preestablished protocol, recognizes the address that has been transmitted and performs a comparison using a comparator 77 with preprogrammed addresses located within its memory 79 (step 105) to determine which subscriber module 53 is to be updated (step 107). The authorization data is decoded (step 109) and the data is written to the SAW resonator map table 83 (step 111).

In dependence upon the commands (step 111), the appropriate SAW resonators 43 corresponding to channels requiring security are alternately keyed on and off by the 10–20 Hz square wave via the AND gates 51, which output to the solid state switches 49. The alternation of the square wave 65 which is "ANDed" with the authorization module 47 output 63 pulses the solid state switches 49 keying the SAW resonator 43 on or off (step 113). This defines a cyclical rate of interdiction Using this apparatus and method, the subscribers 33, 34, 35 are denied access to the channels which have been secured. The sync receiver within the subscriber's television receiver 19 will not be able to process the secured channel.

While specific embodiments of the present invention have been shown and described, many modifications and variations could be made by one skilled in the art without departing from the spirit and scope of the invention. The above description serves to illustrate and not limit the particular form in any way.

I claim:

1. A passive interdiction system for CATV service denial for use in a communication network which transmits CATV signals including subscriber authorization signals and a plurality of CATV channels over a communication path between a headend and at least one subscriber, the system comprising:

means for generating and transmitting at least one subscriber authorization signal from the headend; and an interdiction unit disposed near the location of said subscriber for regulating the denial of selected CATV channels in response to said subscriber authorization signal; said interdiction unit having:

a CATV input for receiving CATV signals which include said plurality of CATV channels and said authorization signal;

at least one subscriber output;

at least one interdiction module associated with each subscriber output, said interdiction module comprising a plurality of passive traps, each trap associated with one of said plurality of CATV channels; and an authorization module for receiving said authorization signal and actively controlling selection of said traps to passively interdict CATV channels associated with said selected traps at a cyclical rate in response to said authorization signal;

whereby said authorization signal identifies which of said traps are selected.

2. The system according to claim 1 wherein said generating means transmits over the vertical blanking interval of a CATV channel.

3. The system according to claim 1 wherein said generating means transmits over a dedicated control data channel.

4. The system according to claim 2 wherein said authorization signals include modulated multibit digital words having unique subscriber addresses and secured channel data.

5. The system according to claim 1, wherein said authorization module includes:

a data receiver for monitoring downstream communications;

a data decoder for decoding said subscriber authorization signals;

a memory storing at least one subscriber address;

a comparator for comparing said decoded subscriber authorization signals with said subscriber address;

an authorization decoder for decoding secured channel data after matching a subscriber address; and a trap memory table for storing said decoded secured channel data to control activation of said plurality of traps.

6. The system for according to claim 5 wherein said memory stores a more than one subscriber address.

\* \* \* \* \*

UNITED STATES PATENT AND TRADEMARK OFFICE
CERTIFICATE OF CORRECTION

PATENT NO. : 6,188,870 B1  
DATED : February 13, 2001  
INVENTOR(S) : Joseph Glaab Page 1 of 1

It is certified that error appears in the above-identified patent and that said Letters Patent is hereby corrected as shown below:

Claims
Column 6, claim 6
Line 47, delete "for".
Line 48, delete "a".

Signed and Sealed this

Eleventh Day of September, 2001

Attest:

*Nicholas P. Godici*

NICHOLAS P. GODICI
*Acting Director of the United States Patent and Trademark Office*

*Attesting Officer*